(12) United States Patent
Chang et al.

(10) Patent No.: US 6,741,618 B1
(45) Date of Patent: May 25, 2004

(54) DEVICE AND METHOD FOR MULTIPLEXING PHYSICAL CHANNEL IN CDMA COMMUNICATION SYSTEM

(75) Inventors: Hoon Chang, Seoul (KR); Hyun-Seok Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/375,895

(22) Filed: Aug. 17, 1999

(30) Foreign Application Priority Data

Aug. 17, 1998 (KR) ........................................ 1998-33863

(51) Int. Cl.[7] .................................................. H04J 3/02
(52) U.S. Cl. ......................................................... 370/537
(58) Field of Search ................................ 370/208, 209, 370/210, 320, 335, 342, 441, 532, 535, 536, 537, 542; 455/455

(56) References Cited

U.S. PATENT DOCUMENTS

| 5,603,081 | A | * | 2/1997 | Raith et al. ............... 455/435.3 |
| 6,064,663 | A | * | 5/2000 | Honkasalo et al. ......... 370/335 |
| 6,363,058 | B1 | * | 3/2002 | Roobol et al. ............... 370/310 |
| 6,377,809 | B1 | * | 4/2002 | Rezaiifar et al. ........... 455/455 |
| 6,393,008 | B1 | * | 5/2002 | Cheng et al. ................ 370/338 |

* cited by examiner

*Primary Examiner*—Chi Pham
*Assistant Examiner*—Alexander O. Boakye
(74) *Attorney, Agent, or Firm*—Dilworth & Barrese, LLP

(57) ABSTRACT

Multiplexing device and method in a mobile communication system. Multiplexing is implemented in two stages to allow a logical channel to be shared, the type of a multiplex unit is defined, and the defined multiplex unit type is determined depending on the type of a physical channel, so that the same kind of physical channels employ the same type of multiplex units.

9 Claims, 7 Drawing Sheets

MULTIPLEX UNIT TYPE 1 (412)

MULTIPLEX UNIT TYPE 2 (414)

MULTIPLEX UNIT TYPE 3 (416)

MULTIPLEX UNIT TYPE 4 (418)

MULTIPLEX UNIT TYPE 5 (420)

DEVICE AND METHOD FOR MULTIPLEXING PHYSICAL CHANNEL IN CDMA COMMUNICATION SYSTEM

BACKGROUND OF THE INVENTION

1. Field of the Invention

The present invention relates to a device and method for communicating a message in a CDMA (Code Division Multiple Access) communication system, and more particularly, to device and method for multiplexing a message on a physical channel.

2. Description of the Related Art

CDMA mobile communication systems have developed from the IS-955 standard focusing only on a voice service to the next generation CDMA (hereinafter referred to as CDMA 2000) which provides a high-speed data transmission capability for establishing various services including high quality voice, moving pictures, and internet browsing. An IS-95 CDMA communication system operates at a maximum data transmission rate of 9.6 kbps or 14.4 kbps since it is directed to provide a voice service whereas the CDMA 2000 operates at a much higher maximum data transmission rate of 2 Mbps. Therefore, the CDMA 2000 can transmit data 256 times faster than the IS-95 standard.

Furthermore, the two standards may be further differentiated whereby a base station assigns a physical channel to a terminal for a short time when necessary in a CDMA communication system based on the CDMA 2000 standard. To similarly assign a physical channel for a short time for a communication system based on the IS-95 standard, a complex modification needs to be made to an existing IS-95 multiplex option, in which a multiplex configuration depends on the number of connected physical channels. Sixteen (16) bits are required to implement the IS-95 multiplexing option. However, it should be noted that it is difficult to apply the multiplex option to a message as short as 5 ms in duration used for rapid assignment of a physical channel.

In view of the above, it is apparent that to implement the IS-95 multiplexing option, a complex table is required to emulate both support of multiple transmission rates and concurrently connect a plurality of physical channels to provide various services as is done in a communication system based on the CDMA 2000 standard. Consequently, there exists a need for a new multiplex configuration that is superior to the inflexible and complex structures of the existing IS-95 multiplex option.

SUMMARY OF THE INVENTION

An object of the present invention is to provide a device and method for constructing a multiplex configuration, in which physical channels are rapidly connected to increase the use efficiency of radio resources in a mobile communication system.

Another object of the present invention is to provide a multiplexing device and method which reflect characteristics of various physical channels.

To achieve the above objects, a multiplexing device and method is provided in a mobile communication system, in which logical channel frames are separated from a received physical channel frame, multiplex units are separated from a logical channel frame, and each multiplex unit is sent to its destination. More precisely, a logical channel multiplexing is performed by receiving a physical channel frame and separating a logical channel frame from the received physical channel frame by analyzing the physical channel frame. Then, a service multiplexing is performed by separating multiplex units from each logical channel frame whose type is defined depending on the type of physical channel containing the logical channel frame and transmitting information of each extracted multiplex unit to a destination.

In accordance with the present invention, multiplexing is implemented in two stages to allow a logical channel to be shared and the type of multiplex unit is defined and the defined multiple unit type is determined depending on the physical channel type, so that the same kind of physical channels employ the same type of multiplex units.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE EMBODIMENT

A mobile communication system (CDMA communication system hereinbelow) according to an embodiment of the present invention includes a 2-stage multiplexing to support characteristics of various physical channels. The 2-stage physical channel multiplexing comprises a first stage defined as logical channel multiplexing followed by a second stage defined as service multiplexing, performed as follows: (1) logical channel frames are separated from a received physical channel frame. This stage is termed logical channel multiplexing in the present invention; and (2) multiplex units are then separated from each logical channel frame and each multiplex unit is transmitted to a destination. This stage is referred to as service multiplexing in the present invention.

In accordance with the present invention, prior to performing physical channel multiplexing in accordance with the present invention, a multiplex configuration specifying procedure must be performed. At the configuration stage, a multiplex unit type is determined for each physical channel.

Figure 1:
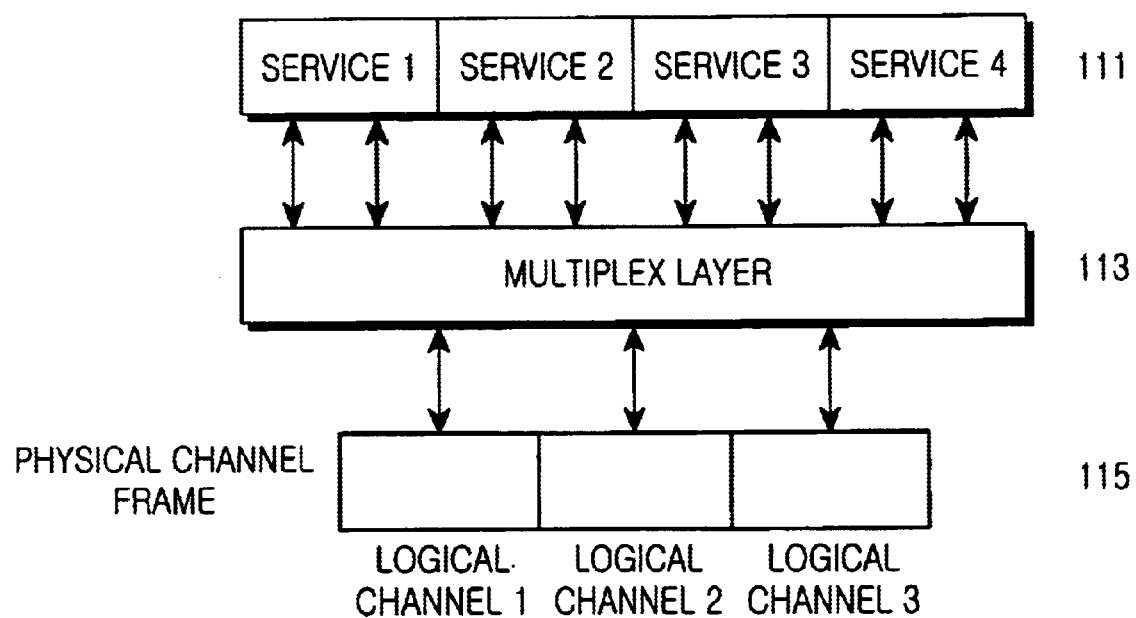
FIG. 1 illustrates a layer which performs a two-stage multiplexing in a CDMA communication system according to an embodiment of the present invention.

FIG. 1 illustrates an embodiment of the 2-stage physical channel multiplexing method in the CDMA communication system according to the present invention.

Referring to FIG. 1, upon receipt of a physical channel frame as indicated by reference numeral 115, a multiplex layer 113 multiplexes the physical channel frame into logical channels as indicated by 115. After logical channel frames are separated from the physical channel frame by the logical channel multiplexing (i.e., Stage 1), the multiplex layer 113 implements service multiplexing (i.e., Stage 2). To perform service multiplexing, each of the logical channel frames is divided into multiplex units and each multiplex unit is sent to a destination, to thereby provide proper services.

Figure 2:
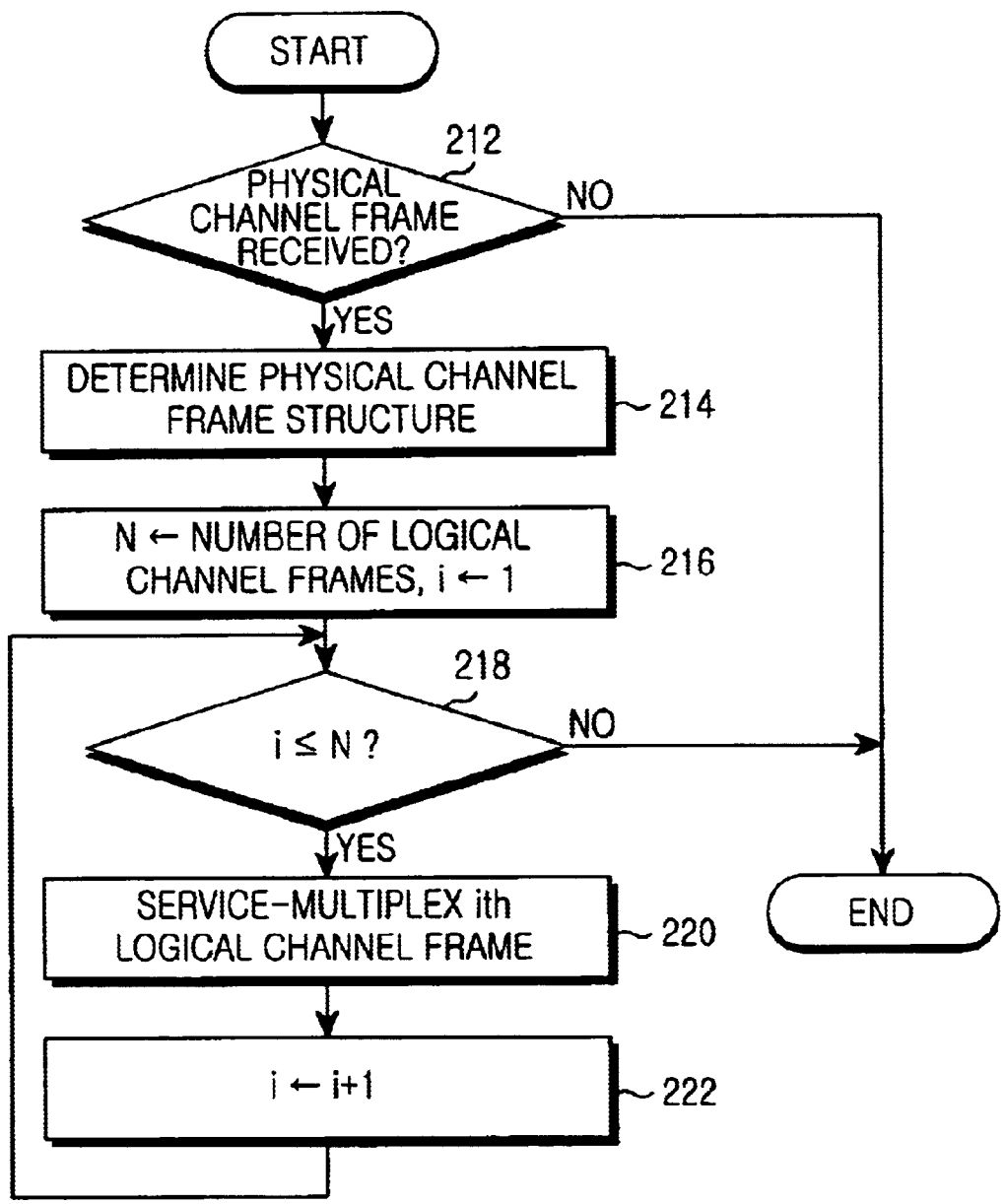
FIG. 2 is a flowchart depicting a logical channel multiplexing in the two-stage multiplexing method in the CDMA communication system according to the embodiment of the present invention.

FIG. 2 is a flowchart depicting logical channel multiplexing according to an embodiment of the present invention.

Referring to FIG. 2, in step 212, a determination is made as to whether a physical channel frame has been received. If so, a message processor (not shown) determines the structure of the received physical channel frame in step 214. The structure of the physical channel frame is preset by mutual agreement between a transmitting side and a receiving side. In the IS-95 standard, the number of logical channel frames contained within the physical channel frame and their location can be determined by checking format bits at the left end of the physical channel frame. For compatibility, the presently described embodiment of the present invention follows the IS-95 standard. However, other embodiments which do not conform or are compatible with the IS-95 standard are within the scope of the present invention. The structure of a physical channel frame based on the IS-95 standard is exemplarily specified as follows.

TABLE 1

| FORMAT BITS | | | | LOGICAL CHANNEL FRAME | | |
| --- | --- | --- | --- | --- | --- | --- |
| trans- mission rate (bit/sec) | com- posite mode | traffic type | traffic mode | logical channel 1 (bit/frame) | logical channel 2 (bit/frame) | logical channel 3 (bit/frame) |
| 9600 | 0 | — | — | 171 | 0 | 0 |
|  | 1 | 0 | 00 | 80 | 88 | 0 |
|  | 1 | 0 | 01 | 40 | 128 | 0 |
|  | 1 | 0 | 10 | 16 | 152 | 0 |
|  | 1 | 0 | 11 | 0 | 168 | 0 |
|  | 1 | 1 | 00 | 80 | 0 | 88 |
|  | 1 | 1 | 01 | 40 | 0 | 128 |
|  | 1 | 1 | 10 | 16 | 0 | 152 |
|  | 1 | 1 | 11 | 0 | 0 | 168 |
| 4800 |  |  |  | 80 | 0 | 0 |
| 2400 |  |  |  | 40 | 0 | 0 |
| 1200 |  |  |  | 16 | 0 | 0 |

It is noted from (table 1) that one physical channel frame can support a maximum of three logical channel frames in accordance with the IS-95 multiplexing option. A receiving side can determine what logical channel frames a physical channel frame contains and where they are located by analyzing format bits. In one embodiment of the present invention, a modification is made to the physical channel structure based on the IS-95 standard in such a way that the structure of a physical channel without format bits is present between a transmitting side and a receiving side. As a result, the format bits are saved and as a result, additional data bits can be further transmitted and received.

After the receiving side detects the number, locations, and sizes of the logical channel frames in the above procedure, it sets a variable N which equates to the number of the logical channel frames detected and sets a variable i to an initial value 1 in step 216 and then performs a service multiplexing procedure. In the service multiplexing procedure, it is determined whether service multiplexing has been completed for all the logical channel frames (N), in step 218. If service multiplexing is not complete, a current logical channel frame is service-multiplexed in step 220. Then, the next logical channel frame is designated (i=i+1) in step 222 and the procedure returns to step 218. Upon completion of service-multiplexing the last logical channel frame (i.e., i=N) procedure ends.

As shown in FIG. 2, service multiplexing is implemented for the first through the Nth logical channel frames detected. A detailed description of service multiplexing will be given hereinbelow with reference to FIGS. 3 and 4.

Figure 3:
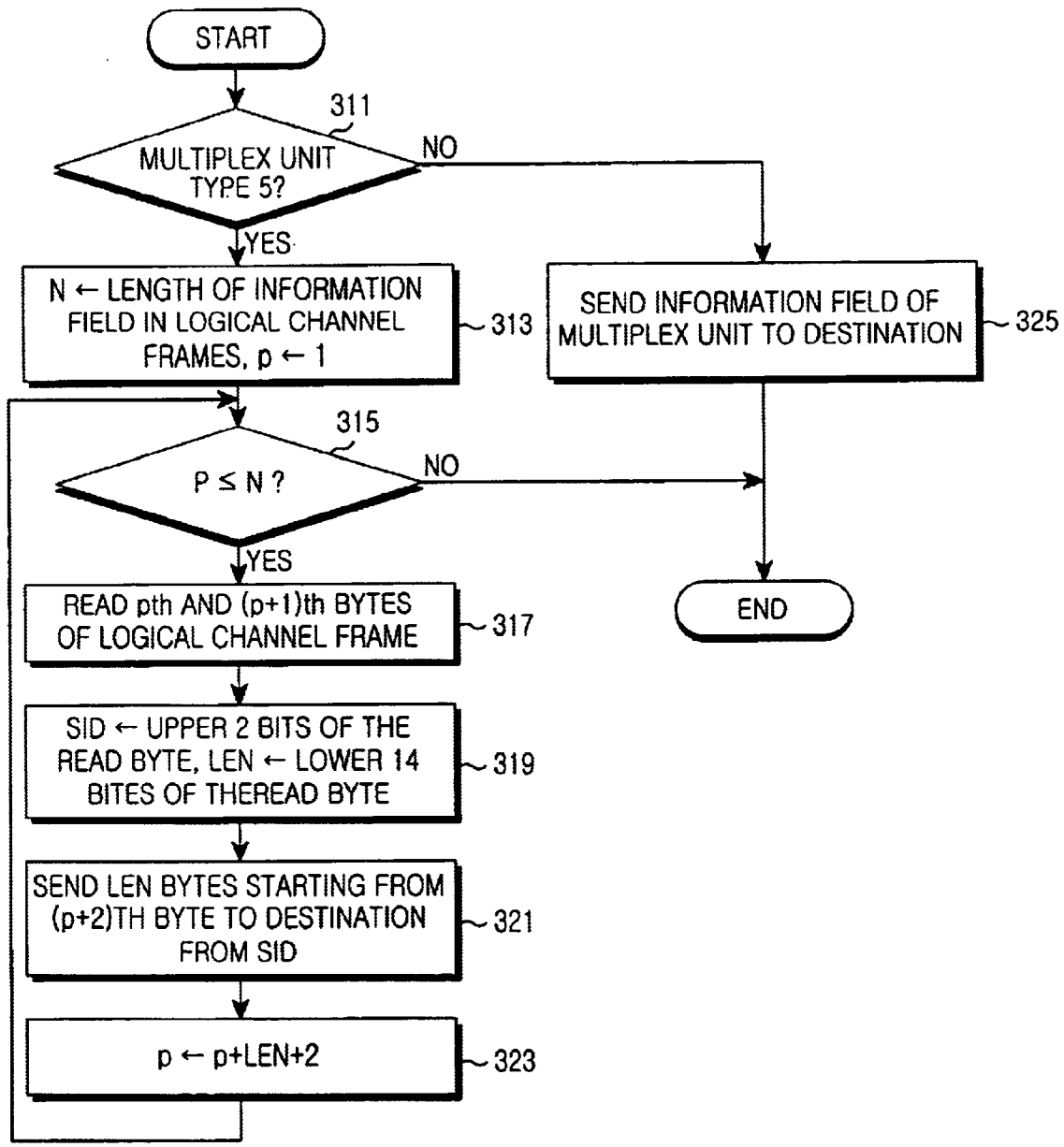
FIG. 3 is a flowchart depicting service multiplexing according to an embodiment of the present invention.

In FIG. 3, at determination step 311, it is determined what multiplex unit type is defined for each logical channel. The multiplex unit is a minimum multiplexed unit which identifies a destination. A destination may be, for example, a Radio Link Protocol (RLP) or Layer 3. A single logical channel may include one or more multiplex units. Multiplex unit types are shown in FIG. 4.

Figure 4:
FIG. 4 illustrates multiplex unit types for service multiplexing according to an embodiment of the present invention.
Figure 4:
Figure 4:
Figure 4:
Figure 4:
Figure 4:
Figure 4:

FIG. 4 illustrates five types of multiplex units used in the CDMA communication system according to the embodiment of an present invention.

In the case of a multiplex unit type 1 as indicated by 412 in FIG. 4, a logical channel frame is free of an overhead field and occupied with information data for one service.

Two formats are available for a multiplex unit type 2 as indicated by 414. A logical channel frame has 0 at the left end in one format as indicated by 414A, and a logical channel frame has 1111 at the left end in the other format as indicated by 414B. Logical channel frames of the multiplex unit type 2 are used to achieve compatibility with the IS-95 standard.

A multiplex unit type 3 also has two formats. In one format as indicated by 416A, a logical channel frame has 0 at the left end and in the other format as indicated by 416B, a logical channel frame has 10111 at the left end. Logical channel frames of the multiplex unit type 3 are also used to achieve compatibility with the IS-95 standard.

A logical channel frame of a multiplex unit type 4 as indicated by 418 includes a service identification (SID) of two bits at the left end. The service type for which the information field of this multiplex unit type will be sent can be determined from the two-bit SID.

Each of the multiplex unit types 1 to 4 occupies a single logical channel frame. Therefore, if a logical channel frame has N bits, each multiplex unit type is also as long as N bits.

A multiplex unit type 5 further includes a field representing length (LEN) and thus a single logical frame can have a plurality of multiplex units of this type. The multiplex unit type 5 has a two-bit SID followed by a four-bit LEN at the left end. The field LEN indicates a value expressed in terms of bytes. The multiplex unit type 5 can support $2^{14}-1$ bytes at maximum.

As described above, each logical channel knows what multiplex unit type it employs.

Returning to FIG. 3, the receiving side determines if the multiplex unit type included in the received logical channel frame is type 5. If the multiplex unit is type 5, indicating a plurality of multiplex units, the procedure goes to step 313. Otherwise, for types 1–4, an information field is extracted from a multiplex unit and transmitted to a destination in step 325. That is, since a logical channel frame of each multiplex unit type is comprised of an overhead field of a few bits at the left end and a corresponding information field, the information field is transmitted to the destination defined by the overhead field of the received multiplex unit.

Figure 5:
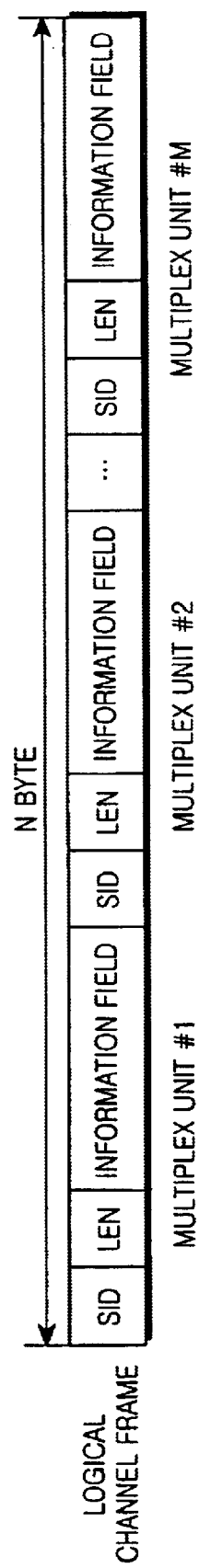
FIG. 5 illustrates an example of a type 5 multiplex unit according to an embodiment of the present invention.

If it was determined, at step 311, that the multiplex unit type is type 5, then the receiving side extracts each of the plurality of multiplex units from the logical channel frame and transmits each extracted multiplex unit to a corresponding destination in step 313. To do so, the receiving side sets the length of an information field in the logical channel frame to N and p to 1 to represent the location of a multiplex unit under process. FIG. 5 illustrates a logical channel frame of the multiplex unit type 5.

In step 315, the receiving side determines whether p£N. If p>N, the receiving side reads a pth byte and a (p+1)th byte in the logical channel frame in step 317. Since the first two bits indicate an SID and the following 14 bits indicate LEN in the multiplex unit type 5, the values of the SID and LEN are stored as SID and LEN variables at step 319. Then, the receiving side sends as many bytes as LEN starting from a (p+2)th byte to a destination designated by the SID in step 321. Thus, a multiplex unit is completely processed. In step 323, the receiving side increments p by the size of the processed multiplex unit, that is, LEN+2 so that the location of the next multiplex unit is designated. Then, the procedure returns to step 315.

By repeating steps 317 to 323, a logical channel frame of the multiplex unit type 5 is sent to one or more destinations. During the procedure, a number of information bytes (i.e., LEN bytes) are sent to a destination represented by an SID. Referring again to step 315, if the value of p is larger than the size of the logical channel frame, the receiving side determines that all the multiplex units have been completely processed, in step 315, and service multiplexing is then terminated.

As compared to the IS-95 standard where only logical channel multiplexing is implemented, the 2-stage physical channel frame multiplexing method of the present invention is a more flexible solution to achieve a support level commensurate with the CDMA 2000 system which supports various services while simultaneously ensuring compatibility with the existing IS-95 system.

To employ the 2-stage physical channel frame multiplexing scheme of the present invention, a specification of positioning logical channel frames in a physical channel frame and further positioning multiplex units in the logical channel frames should be preset between a transmitting side and a receiving side at a configuration stage. The multiplexing specification is referred to herein as a multiplex configuration.

The multiplex configuration includes two aspects: physical channel frame configuration and multiplex unit configuration. The present invention preferably follows the physical channel frame configuration defined by the CDMA 2000 standard. To specify a different multiplex configuration for each physical channel type, Table 2 lists physical channels and associated transmission rates which the CDMA 2000 should support.

TABLE 2

| PHYSICAL CHANNEL | TRANSMISSION RATE |
| --- | --- |
| fundamental channel | 9.6 kbps, 14.4 kbps |
| supplemental channel | 9.6 kbps, 19.2 kbps, 38.4 kbps, 6.8 kbps, 153.6 kbps, 307.2 kbps, 614.4 kbps, 1036.8 kbps, 1228.8 kbps, 2073.6 kbps, 2457.6 kbps, 14.4 kbps, 28.8 kbps, 57.6 kpbs, 115.2 kbps, 230.4 kbps, 460.8 kbps, 921.6 kbps, 1036.8 kbps, 1843.2 kbps, 2073.6 kbps |
| dedicated control channel | 9.6 kbps |

The physical channels listed in Table 2 can have logical channels as shown in Table 3 in the IS-95 standard.

TABLE 3

| PHYSICAL CHANNEL | LOGICAL CHANNEL |
| --- | --- |
| fundamental channel | traffic channel 1, traffic channel 2, MAC channel, signalling channel |
| supplemental channel | traffic channels |
| dedicated control channel | traffic channel, MAC channel, signalling channel |

As shown in Table 3, the fundamental channel is comprised of four logical channels, the supplemental channel is comprised of a plurality of logical channels, and the dedicated control channel is comprised of three logical channels. To support the 2-stage multiplexing scheme, multiplex unit types for the logical channels of the physical channels should be predetermined by mutual agreement between a transmitting side and a receiving side.

The present invention describes a multiplex configuration in which a multiple unit type is specified for each logical channel according to the type of physical channel. Assuming that a terminal has a fundamental channel, a dedicated control channel, and three supplemental channels where each supplemental channel includes eight logical channels, the terminal and a base station should determine a multiple unit type for each of 31 logical channels in total, that is, 4 logical channels for the fundamental channel, 3 logical channels for the dedicated control channel, and 24 logical channels for the three supplemental channels. In an embodiment of the present invention, multiplex unit types are determined for as many logical channels of the fundamental channel indicated by 612 in FIG. 6 and the dedicated control channel indicated by 616, and one multiplex unit type is determined for the supplemental channel regardless of the number of supplemental channels and their logical channels, to thereby efficiently implement a multiplex configuration.

The present invention determines a multiplex unit type according to the type of physical channels, whereas the IS-95 standard determines multiplex units type for physical channels in current use. The CDMA 2000 is too complicated to employ as an extension of the IS-95 standard. Therefore, the multiplex configuration according to the embodiment of the present invention is free of complexity of the IS-95 multiplex option and obviates the need for renewing a multiplex configuration when the number of physical channels is changed.

Figure 7:
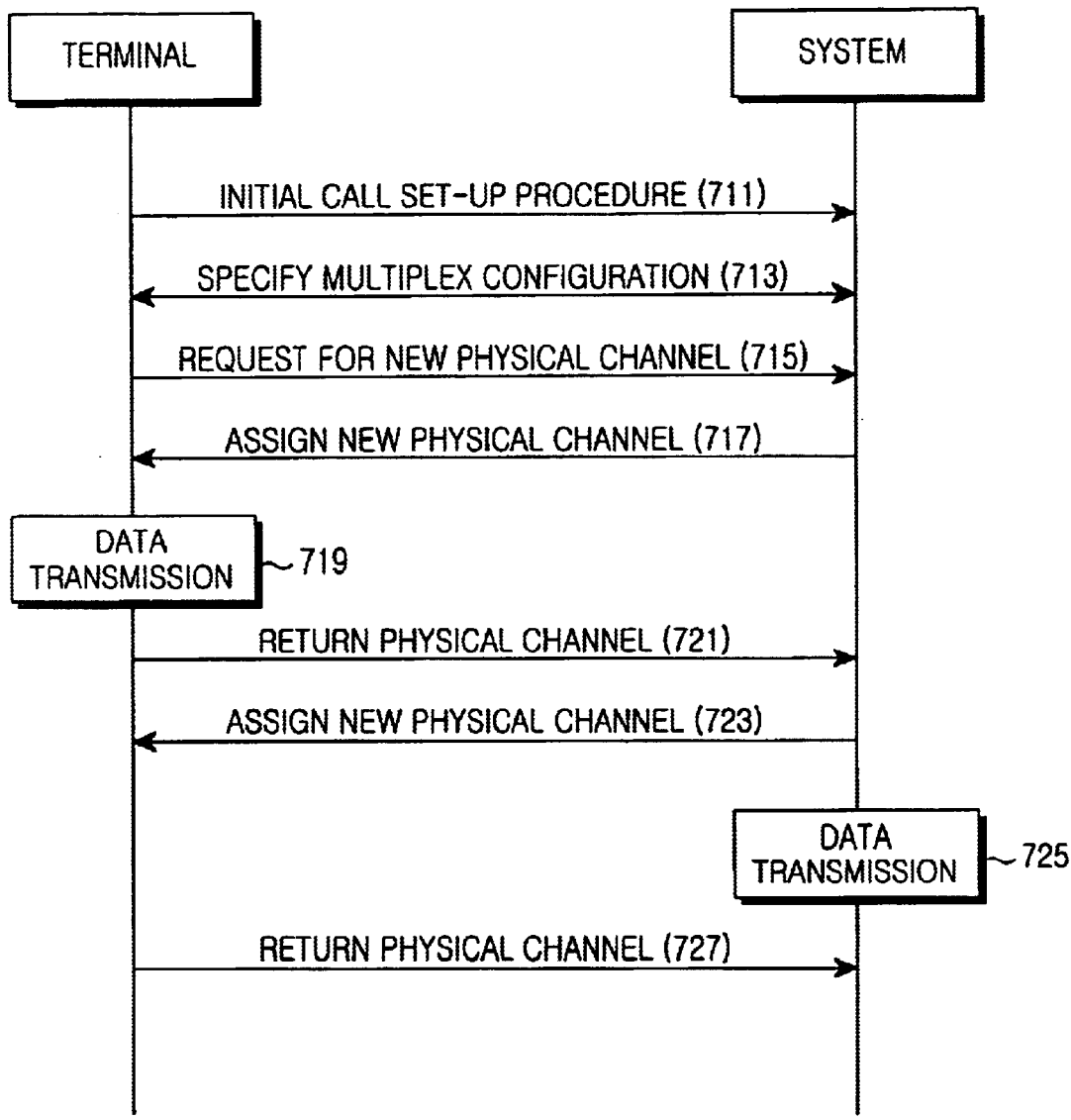
FIG. 7 illustrates channel assignment and data exchanges between a base station and a terminal in the CDMA communication system according to an embodiment of the present invention.

FIG. 7 illustrates an example of the multiplex configuration as one embodiment of the present invention.

Figure 6:
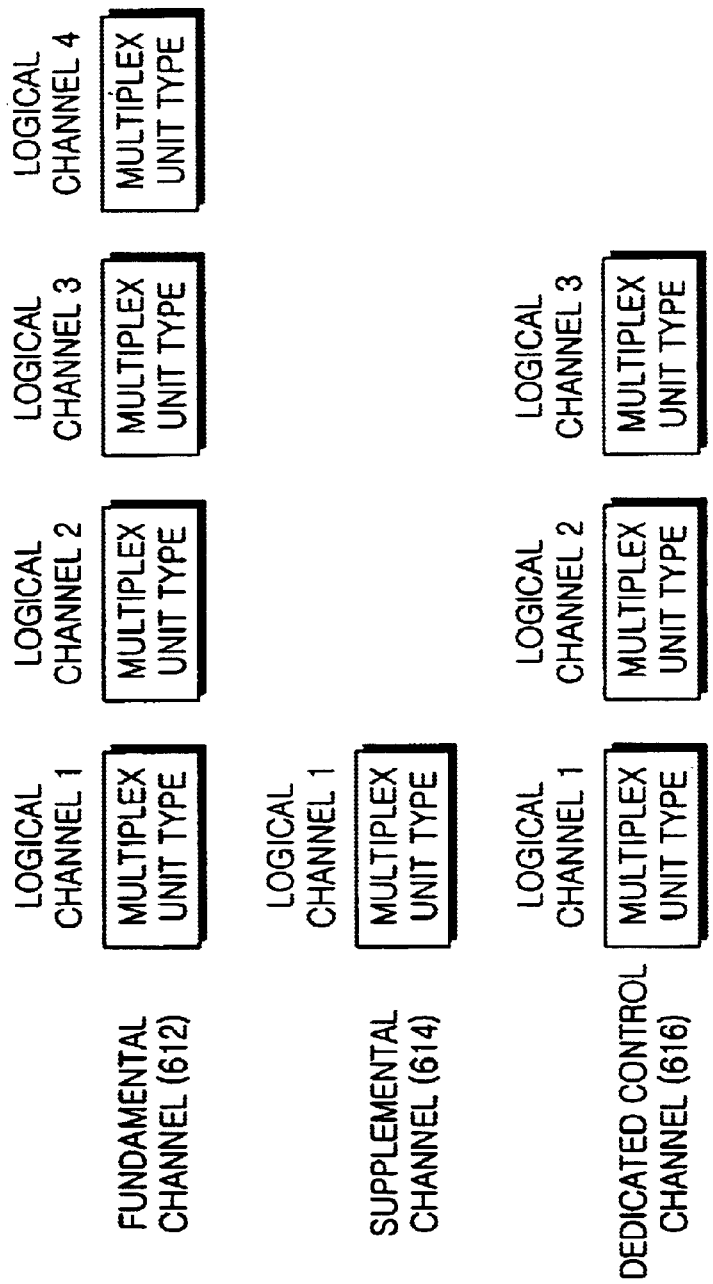
FIG. 6 illustrates a multiplex configuration in the CDMA communication system according to an embodiment of the present invention.

Referring to FIG. 7, upon request for a call set-up by a terminal in step 711, the terminal and a base station perform a call set-up procedure and determine the multiplex configuration together in step 713. They specify a multiplex unit type for each physical channel type as shown in FIG. 6. Thus, there is no need for constructing a new multiplex configuration regardless of the generation or release of a physical channel.

Upon completion of constructing the multiplex configuration, the terminal makes a request for a new physical channel in step 715 and the base station responds by assigning the physical channel in step 717. Then, the terminal sends data on the physical channel in accordance with the 2-stage multiplexing method of the present invention using the predetermined multiplex configuration in step 719. The terminal returns the physical channel to the base station in step 721. Note, however, that the multiplex configuration is not changed. Therefore, when the base station assigns a new physical channel to the terminal and sends data on the new physical channel to the terminal, the pre-established multiplex configuration in the 2-stage multiplexing method remains valid (steps 721 to 727).

In accordance with an embodiment of the present invention as described above, the 2-stage multiplexing method overcomes the disadvantages of the IS-95 standard by enabling a physical channel to be rapidly assigned, resulting in efficient use of radio resources by pre-constructing a simplified multiplex configuration specifying procedure.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A physical channel frame multiplexing method in a CDMA communication system, comprising the steps of:

performing a logical channel multiplexing by receiving a physical channel frame including one or more logical channel frames and separating said logical channel frames from the received physical channel frame, each of said logical channel frames having at least one multiplex unit; and performing a service multiplexing by separating said multiplex units whose type are defined by the received physical channel type and transmitting information of each multiplex unit to a destination;

wherein the multiplex unit types include a first multiplex unit type in which one multiplex unit is assigned to one logical channel frame, and a second multiplex unit type in which a multiplex unit is comprised of a service identification (SID), a length, and information fields.

2. The method of claim 1, wherein the service multiplexing step further comprises the steps of:

extracting an information field of the received logical channel frame and transmitting the information field to a destination, if the logical channel frame is of the first multiplex unit type; and determining the SID and length information of the received logical channel frame, extracting an information field whose length corresponds to said length information from the logical channel frame, transmitting the information field to a destination, and repeating the determining, extracting, and transmitting procedure a number of times equal to the numbers of the multiplex unit of the logical channel frame, if the logical channel frame is of the second multiplex unit type.

3. The method of claim 1, wherein the physical channel is defined as one of a fundamental channel, a supplemental channel, and a dedicated control channel.

4. The method of claim 3, wherein the fundamental channel is one of a traffic channel 1, a traffic channel 2, a MAC channel, and a signaling channel.

5. The method of claim 3, wherein the supplemental channel is a traffic channel.

6. The method of claim 3, wherein the dedicated control channel is one of a traffic channel, MAC channel, and a signaling channel.

7. A multiplex configuration constructing method in a CDMA communication system, comprising the steps of:

(i) performing a call set-up procedure when an initial call is set-up, and determining a regulation of positioning multiplex units in a physical frame performed by a base station and a terminal;

(ii) assigning a physical channel and multiplexing a physical channel frame received on the assigned channel based on the multiplex configuration; and (iii) multiplexing a received physical channel frame upon generation of a new call based on the multiplex configuration.

8. The method of claim 7, wherein the step (iii) comprises the substeps of:

performing a logical channel multiplexing by receiving a physical channel frame and separating a logical channel frame from the received physical channel frame by analyzing the physical channel frame; and performing a service multiplexing by separating multiplex units from the logical channel frame whose type are defined depending on the type of the physical channel frame from the logical channel frame and transmitting information of each multiplex unit to a destination.

9. A physical channel frame multiplexing device in a CDMA communication system, comprising:

a logical channel multiplexer for receiving a physical channel frame and separating a logical channel frame from the received physical channel frame; and a service multiplexer for separating multiplex units from said logical channel frame whose type is defined by the physical channel type and transmitting information of each separated multiplex unit to a destination;

wherein the multiplex unit types include a first multiplex unit type in which one multiplex unit is assigned to one logical channel frame, and a second multiplex unit type in which a multiplex unit is comprised of a service identification (SID), a length, and information fields.

* * * * *